United States Patent [19]
Whitman

[11] Patent Number: 4,556,100
[45] Date of Patent: Dec. 3, 1985

[54] THERMAL ENERGY STORAGE UNIT

[76] Inventor: William C. Whitman, 3 Fourth St., New Brunswick, N.J. 08901

[21] Appl. No.: 616,842

[22] Filed: Jun. 4, 1984

Related U.S. Application Data

[63] Continuation-in-part of Ser. No. 359,366, Mar. 18, 1982, abandoned.

[51] Int. Cl.[4] .................. F28D 17/00; F28D 21/00
[52] U.S. Cl. .................. 165/10; 126/430; 126/436
[58] Field of Search .............. 165/10; 126/430, 436

[56] References Cited

FOREIGN PATENT DOCUMENTS 2428223 2/1980 France .................. 165/10
143459 12/1979 Japan .................. 165/10

Primary Examiner—Albert W. Davis, Jr.
Attorney, Agent, or Firm—Robert A. Green

[57] ABSTRACT

The disclosure is of a thermal storage assembly comprising a housing in which are mounted a plurality of plastic containers of chemical salts of a type which can store thermal energy. Separators are provided to space the containers from each other, and a source of vapor is provided to maintain a vapor pressure in the housing which in turn maintains the moisture content of the salts in the containers.

16 Claims, 6 Drawing Figures

THERMAL ENERGY STORAGE UNIT

This application is a continuation-in-part of Ser. No. 359,366 filed Mar. 18, 1982, now abandoned.

BACKGROUND OF THE INVENTION

The present invention relates to thermal energy (heat or cold) storage devices, especially for solar systems, which generally comprise huge containers of rocks; smaller, but still large, containers of water; or still smaller housings of metal tubes which contain chemicals which can absorb and give up heat as the system operates. For strength and to provide the desired self-support, these metal tubes must be relatively thick-walled so that they are too expensive for widespread use.

Many advantages would accrue if the industry could use thin sheets of plastic as containers for thermal storage chemicals. One proposed structure uses individual plastic tubes as chemical carriers. However, no simple and inexpensive support means is known for such individual tubes. An improved thermal storage system using plastic chemical carriers is described and claimed in copending application Ser. No. 920,962, filed June 30, 1978 now U.S. Pat. No. 4,287,942 granted Sept. 8, 1981. This application describes various basic concepts in plastic chemical carriers and support therefor, and the invention described herein relates generally to improvements in this basic invention.

DESCRIPTION OF THE INVENTION

Figure 1:
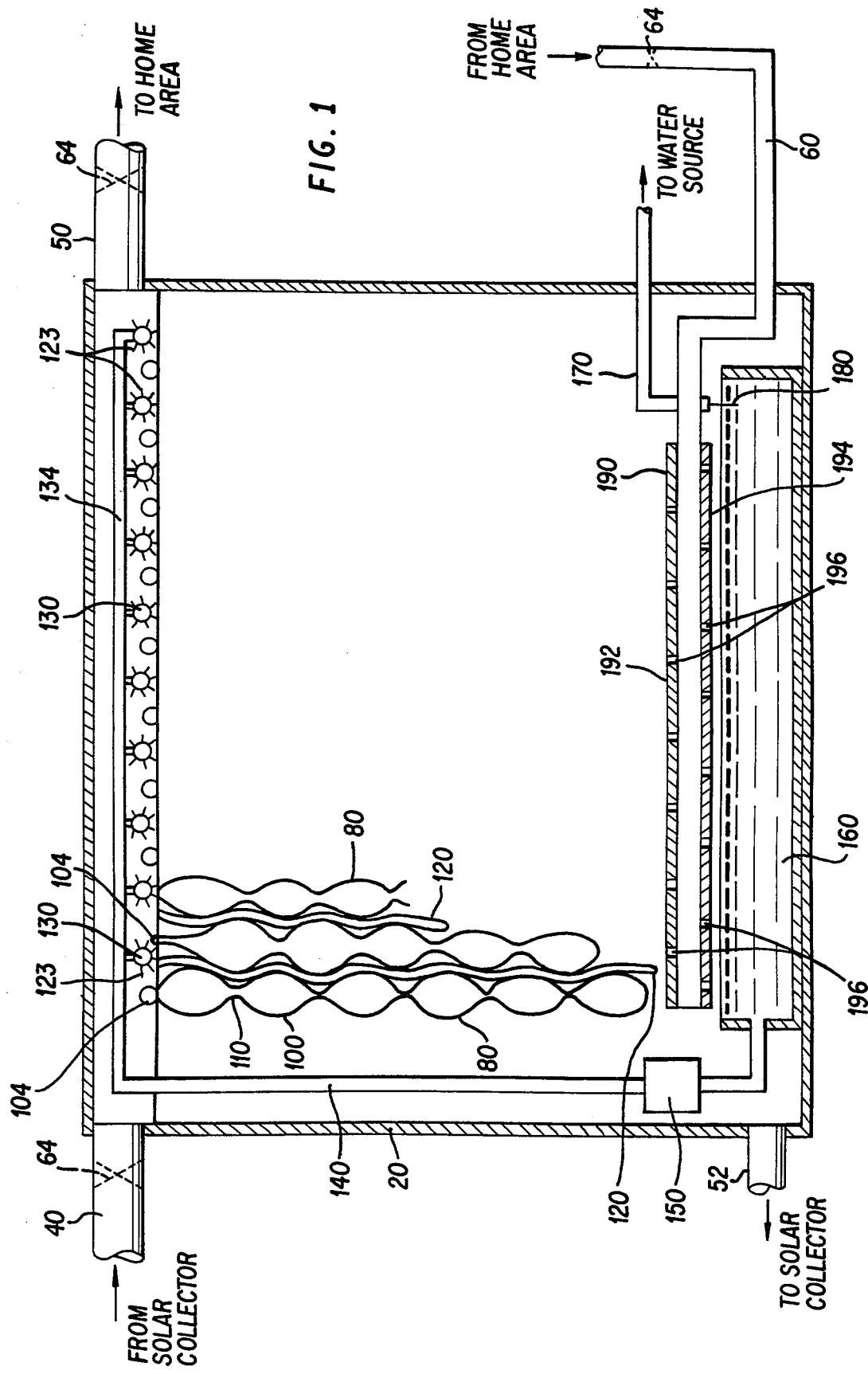
FIG. 1 is a side elevational view, partly in section, of apparatus embodying the invention.

A thermal energy storage apparatus 10, especially for use in solar energy systems, is shown in FIG. 1 and includes a housing 20 of any suitable material having an inner storage area 30, an air transport pipe 40 at its upper end which comes from the solar collector (not shown) which is exposed to the sun at a remote location, and an air outlet pipe 50 at its upper end which goes to the building area to be heated. A pipe 52 returns to the solar collector. An air inlet pipe 60 is at the bottom of the housing and is a return pipe from the building area. Controllable dampers 64 are provided as required. Any suitable air flow arrangement may be used, as will be understood by those skilled in the art.

Figure 2:
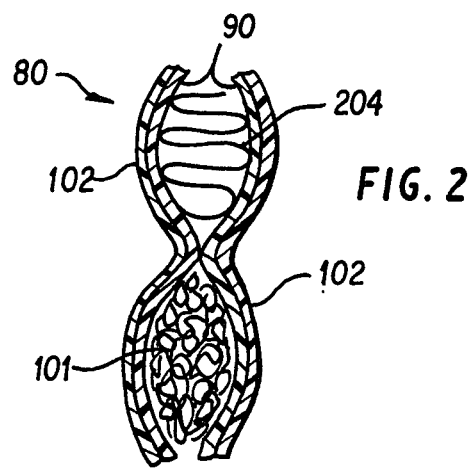
FIG. 2 is a sectional view of a portion of a thermal storage unit embodying the invention.

The housing 20 contains a plurality of thermal storage units 80 and, as described in the above-mentioned application, the storage units are made up of sheets 90 of synthetic resinous material, such as polypropylene, which may have a thickness of as little as about 5 mils or so, secured together to form parallel tubular pockets 100 in which chemical salts 101 (FIGS. 2 and 3) are packed. The ends of the pockets are sealed to hold the salts in place in the pockets. The salts are of a type which can absorb, store, and give up thermal energy. The tube sheets 90 are preferably coated with an impervious layer 102 (FIG. 3) of paint, such as aluminum paint, or other material to retain moisture within the pockets 100.

The storage units 80 are secured at their upper ends to horizontal rods 104 which themselves are suitably supported on opposite side walls 22 and 24 of the housing 20. The storage units 80 are parallel to each other and hang vertically.

The storage units 80 are positioned so that, considering adjacent units, the tubular pockets 100 of one are disposed adjacent to the spaces 110 between two tubular pockets of the adjacent unit. Thus, a sinuous laminar air flow path is provided upwardly, or downwardly, as desired, through the housing between each pair of storage units, and this provides optimum air turbulence and thermal transfer between the flowing air through the sheets 90 and the chemical salts in the pockets 100 of the storage units.

Figure 3:
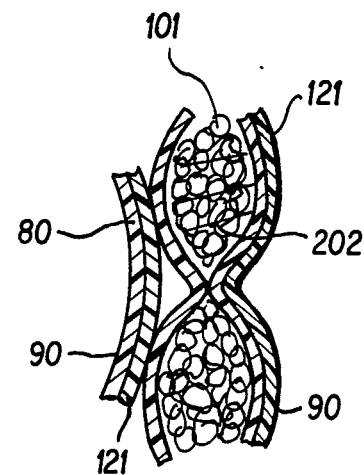
FIG. 3 is a sectional view of a portion of a thermal storage unit embodying a modification of the invention.

According to one aspect of the invention, the thermal storage units 80 are maintained properly spaced from each other by means of spacers disposed between the storage units. In one arrangement, the spacers comprise strings or ropes 120 (FIG. 1) disposed between the storage units. One or more of the strings 120 may be provided, and they may be secured to the rods 104 and hang downwardly therefrom. If desired, the spacers may comprise integral ribs 121 formed in the walls of the storage units transverse to the pockets, as shown in FIG. 3.

According to another aspect of the invention, means are provided for maintaining a pressure of water vapor in the housing 20 to prevent moisture loss from the salts in the storage units 80. In one suitable arrangement, this means comprises a plurality of apertured pipes 130 disposed horizontally parallel to and above the support rods 104 and positioned to provide a spray or mist of water or other fluid in the housing between the heat storage units. In one arrangement, the water pipes 130 are disposed between the support rods 104. In another arrangement, the support rods themselves may be the apertured water pipes, or both arrangements may be used in combination.

The water pipes 130, whatever arrangement is used, are coupled to a suitable manifold 134 and to an inlet pipe 140, to which a pump 150 is coupled and to a collector or reservoir 160 disposed on the floor of the housing to collect any water which condenses in the housing. An inlet water pipe 170 is connected to the reservoir to admit water thereto from a water source, and, if desired, a level control 180 is provided in the reservoir 160 in conjunction with the inlet water pipe.

An optional air guide member is provided in the housing, and this member comprises a large-area flat duct 190 disposed horizontally above the reservoir 160 and beneath the storage units 80 and having the air inlet pipe 60 coupled to one end thereof. The duct 190 includes large-area top and bottom plates or walls 192 and 194, the top plate having a plurality of apertures 196, through which air flows. The bottom plate also includes apertures 196 so that condensed fluid in the duct can fall into the reservoir 160.

The water spray is represented by numeral 123.

Figure 5:
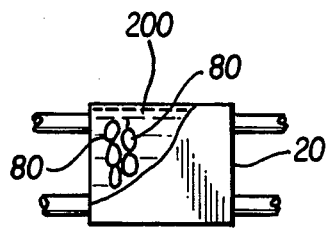
FIG. 5 is a side view, partly in section, of a modification of the invention.
Figure 4:
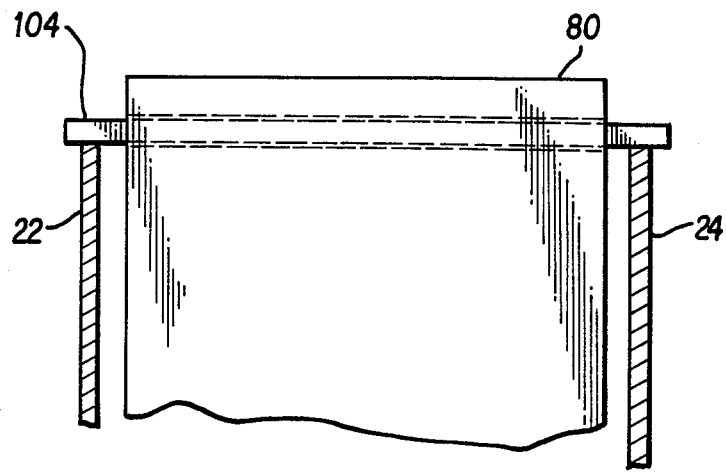
FIG. 4 is a side sectional view of a portion of the apparatus of FIG. 1.

In a modification of the invention, illustrated schematically in FIG. 5, the fluid spray is not employed, but the housing 20 is filled with water 200 or other fluid in which the storage units 80 are embedded. The fluid 200 is circulated through the thermal collection and distribution system to provide the desired thermal distribution from sun to home.

In a modification of the storage units 80, thermal conductivity may be improved by including, in the chemical salts, metal particles or mesh 202 of aluminum or the like as illustrated in FIG. 3. Also, any suitably shaped metal insert 204 (FIG. 2) may be included with salt.

Figure 6:
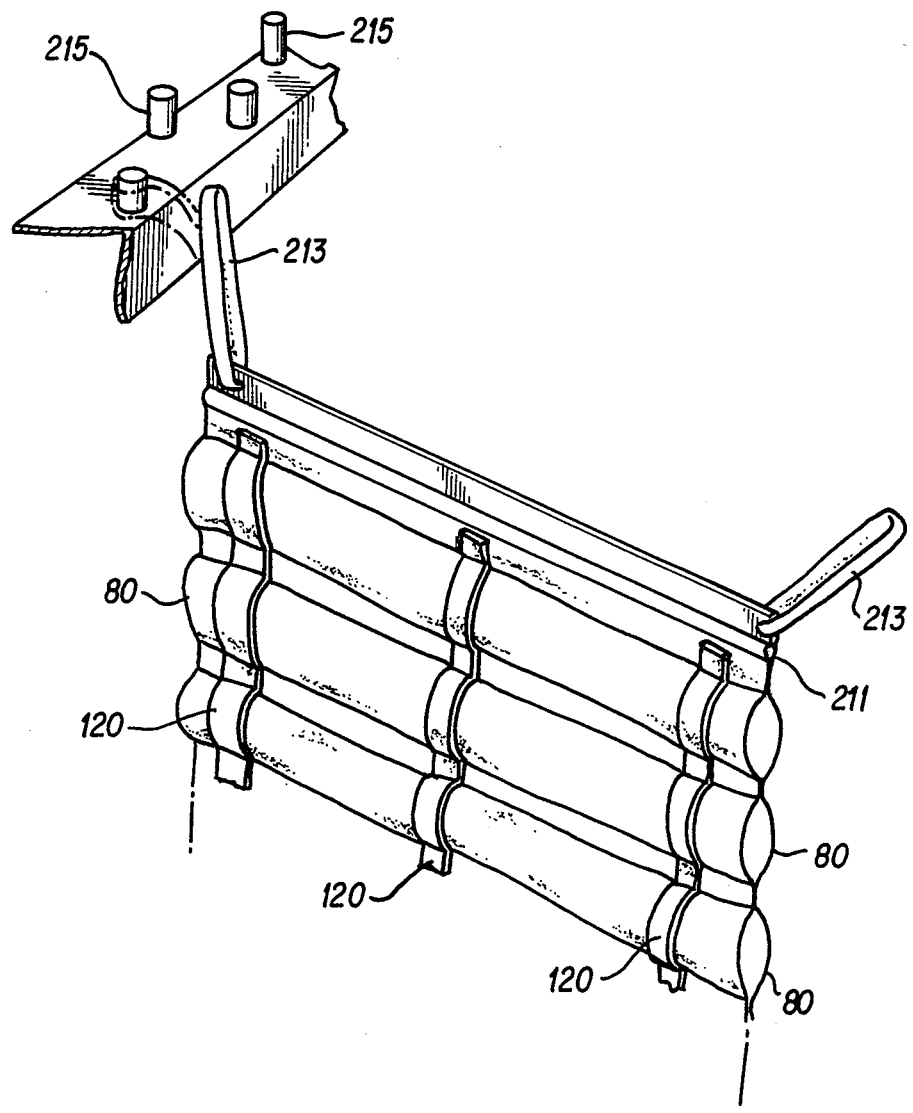
FIG. 6 is a perspective view of the invention and a support arrangement therefore.

In a modification of the invention, the elongated spacers 120 are made of a flexible material such as rubber, or some kind of synthetic material. For optimum operation, perhaps three such straps should be provided, one near each edge of the assembly of tubes and one generally in the middle, as shown in FIG. 6.

Using a flexible material for the spacers 120 has the advantage that the spacers conform closely to the surfaces of the pockets 100 in the units 80 and thus insure optimum heat transfer, with minimal lateral losses up and down the unit 80. The flexible spacers 120 may be circular in cross-section or have any other suitable cross-section.

In addition, each salt-carrying unit 80 may carry a stiffening rod 211 in a pocket at its upper end, and the upper end of each unit may be provided with strap loops 213 which can be placed around pegs 215 provided in the upper end of the housing 20 in which the units 80 are supported. The strap loops 213 support the units 80.

What is claimed is:

1. A thermal storage assembly comprising
a housing,
a plurality of containers of chemical salts of a type which can store thermal energy, said containers comprising plastic sheets secured together to form pockets in which said salts are packed, and
means in said housing for maintaining said containers spaced from each other, said means comprising lengths of material disposed between said containers and extending along the lengths of said containers.

2. The assembly defined in claim 1 wherein said ropes are made of a flexible material which conforms to the surfaces of the containers between which they are positioned.

3. The apparatus defined in claim 1 and including second means in contact with said containers for maintaining the moisture content of the salts therein.

4. The apparatus defined in claim 1 wherein said second means comprises a source of a spray of water.

5. The apparatus defined in claim 1 wherein said second means comprises a plurality of apertured pipes disposed above said containers in said housing and adapted to provide water vapor in said housing.

6. The apparatus defined in claim 1 and including support rods for said containers.

7. The apparatus defined in claim 6 wherein said support rods are in the form of pipes which can receive a supply of water and can provide water vapor in said housing.

8. The apparatus defined in claim 1 wherein said means comprises a moisture barrier coating on the sheets of said containers.

9. The apparatus defined in claim 1 and including a fluid in said housing enclosing said containers to maintain the moisture content therein.

10. The assembly defined in claim 1 wherein said lengths of material hang vertically between said containers with one length positioned at each edge of said containers and one length at about the middle of said containers.

11. The assembly defined in claim 1 and including a plurality of loops secured to the upper end of each container, and a plurality of pegs secured to the upper end of said housing on which said loops can be threaded to secure said containers in place.

12. The apparatus defined in claim 1 wherein said lengths of material are narrow strips of material.

13. A thermal storage assembly comprising
a housing,
a plurality of containers of chemical salts of a type which can store thermal energy, said containers comprising plastic sheets secured together to form horizontal pockets in which said salts are packed,
said containers hanging vertically in said housing and being positioned so that, considering two adjacent containers, the horizontal pockets of one are positioned generally aligned with the space between two adjacent pockets of the adjacent container, whereby a curved air flow path and turbulence in air flow are provided between adjacent containers, and
a plurality of spacer means extending vertically between adjacent containers and generally following the contours of said containers and maintaining said containers spaced from each other along substantially their entire lengths to insure maintenance of said air flow.

14. The apparatus defined in claim 13 wherein said means comprises lengths of rope disposed between said containers and extending along the lengths of said containers.

15. The apparatus defined in claim 13 wherein said means comprises integral ribs formed in the outer walls of said containers and extending along the lengths thereof.

16. The apparatus defined in claim 13 wherein said spacer means comprise narrow strip-like lengths of material.

* * * * *